(12) United States Patent
Mano

(10) Patent No.: US 9,529,557 B2
(45) Date of Patent: Dec. 27, 2016

(54) APPARATUS AND METHOD FOR DETERMINING RESTRICTION AVOIDANCE PROCESSING, AND COMPUTER-READABLE STORAGE MEDIUM FOR COMPUTER PROGRAM

(71) Applicant: Konica Minolta, Inc., Tokyo (JP)

(72) Inventor: Jun Mano, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/079,869

(22) Filed: Mar. 24, 2016

(65) Prior Publication Data
US 2016/0283179 A1   Sep. 29, 2016

(30) Foreign Application Priority Data
Mar. 25, 2015 (JP) .................................. 2015-063203

(51) Int. Cl.
*G06F 3/12* (2006.01)
*H04N 1/00* (2006.01)

(52) U.S. Cl.
CPC ........... *G06F 3/1255* (2013.01); *G06F 3/1204* (2013.01); *G06F 3/1286* (2013.01); *G06F 3/1287* (2013.01); *H04N 1/00411* (2013.01); *H04N 2201/0094* (2013.01)

(58) Field of Classification Search
CPC .... G06F 3/1255; G06F 3/1204; G06F 3/1286; G06F 3/1287; H04N 1/00411; H04N 2201/0094

USPC ........................................................ 358/1.15
See application file for complete search history.

(56) References Cited

U.S. PATENT DOCUMENTS

| | | | |
|---|---|---|---|
| 2001/0050783 A1* | 12/2001 | Sato ................... | H04N 1/00957 358/1.15 |
| 2007/0053733 A1* | 3/2007 | Yokoya .................... | B42C 1/10 399/407 |
| 2008/0088875 A1* | 4/2008 | Taira .................. | G03G 15/6538 358/1.15 |
| 2008/0162736 A1* | 7/2008 | Tanaka .................. | G06F 3/1204 710/7 |

FOREIGN PATENT DOCUMENTS

JP     2014-232503 A    12/2014

* cited by examiner

*Primary Examiner* — Allen H Nguyen
(74) *Attorney, Agent, or Firm* — Osha Liang LLP

(57) ABSTRACT

An apparatus determines, when values of at least three items are mutually in a restriction relationship where applying the values concurrently are prohibited, avoidance processing for avoiding the restriction relationship. The apparatus includes a storage portion for storing degree of importance of each of at least three items; and a determination portion configured to set one item of at least three items at a trigger item, determine whether the restriction relationship is to be avoided by changing the value of a lower item to another value, the lower item being an item given the degree of importance lower than or equal to that of the trigger item, and determine, when the restriction relationship is determined to be avoided, processing of changing the value to that another value as the avoidance processing used when the value is to be set for the trigger item.

20 Claims, 18 Drawing Sheets

FIG. 3

| DIMENSION X1 | | DIMENSION X2 | | ... | DIMENSION XM | | DIMENSION Y1 | | | DIMENSION Y2 | | | ... | DIMENSION YN | | |
|---|---|---|---|---|---|---|---|---|---|---|---|---|---|---|---|---|
| ITEM | VALUE | ITEM | VALUE | ... | ITEM | VALUE | ITEM | VALUE | | ITEM | VALUE | | ITEM | VALUE | | |
| | | | | | | | Y11 | y111 | | Y12 | y121 | | ... | YN1 | yN11 | |
| | | | | | | | | y112 | | | y122 | | | | yN12 | |
| | | | | | | | Y21 | y211 | | Y22 | y221 | | ... | YN2 | yN21 | |
| | | | | | | | | y212 | | | y222 | | | | yN22 | |
| | | | | | | | ... | ... | | ... | ... | | | ... | ... | |
| X11 | x111 | X21 | x211 | ... | XM1 | xm11 | N/A | N/A | N/A | N/A | N/A | N/A | | N/A | N/A | N/A |
| | | | x212 | ... | | xm12 | A | A | N/A | N/A | A | N/A | | N/A | A | A |
| | x112 | X22 | x221 | ... | XM2 | xm21 | N/A | N/A | N/A | A | N/A | N/A | | A | N/A | A |
| | | | x222 | ... | | xm22 | N/A | N/A | N/A | A | N/A | A | | N/A | A | N/A |
| X12 | x121 | — | — | ... | XM1 | xm11 | A | A | N/A | N/A | A | N/A | | N/A | N/A | N/A |
| | | | | | | xm12 | N/A | N/A | N/A | A | N/A | N/A | | A | N/A | N/A |
| | x122 | — | — | ... | XM2 | xm21 | N/A | N/A | N/A | A | N/A | N/A | | N/A | A | N/A |
| | | | | | | xm22 | N/A | N/A | N/A | A | N/A | N/A | | N/A | N/A | N/A |

| PAPER SIZE | DOCUMENT ORIENTATION | PUNCH MODE |||||||
|---|---|---|---|---|---|---|---|---|
| | | 2-HOLE |||| 3-HOLE |||
| | | PUNCH POSITION |||| PUNCH POSITION |||
| | | TOP | LEFT | RIGHT | | TOP | LEFT | RIGHT |
| A3 | VERTICAL | N/A | N/A | N/A | | N/A | N/A | N/A |
| | HORIZONTAL | A | N/A | N/A | | A | N/A | N/A |
| A4 | VERTICAL | N/A | N/A | N/A | | A | N/A | N/A |
| | HORIZONTAL | N/A | N/A | N/A | | N/A | N/A | N/A |

| ITEM | DEGREE OF PRIORITY |
|---|---|
| FOLDING | 2 |
| PAPER TRAY | 4 |
| SORTING | 4 |
| DOCUMENT ORIENTATION | 4 |
| PERFECT BINDING SETTING | 3 |
| FINISHER | 1 |
| PAPER SIZE | 2 |
| PUNCH MODE | 2 |
| PUNCH POSITION | 3 |
| ⋮ | ⋮ |

| | ITEM | SETTABLE VALUE | CONTROL TYPE | PAIRING CHECKBOX | RECOVER VALUE | | |
|---|---|---|---|---|---|---|---|
| | | | | | RECOVER VALUE1 | RECOVER VALUE2 | RECOVER VALUE3 |
| 5A1 (5A) — FOLDING | FOLDING | OFF | CHECKBOX +COMBOBOX | CHECKFOLD | – | – | – |
| | | MIDDLE FOLDING | | | OFF (CHECKBOX) | – | – |
| | | FOLDING IN THREE | | | OFF (CHECKBOX) | – | – |
| 5A2 (5A) — PAPER TRAY | PAPER TRAY | TRAY1 | COMBOBOX | – | TRAY3 | TRAY2 | – |
| | | TRAY2 | | | TRAY1 | TRAY3 | – |
| | | TRAY3 | | | TRAY1 | TRAY2 | – |
| 5A3 (5A) — SORTING | SORTING | ON | CHECKBOX | – | OFF | – | – |
| | | OFF | | | ON | – | – |
| 5A4 (5A) — DOCUMENT ORIENTATION | DOCUMENT ORIENTATION | VERTICAL | RADIOBUTTON | – | HORIZONTAL | – | – |
| | | HORIZONTAL | | | VERTICAL | – | – |
| 5A5 (5A) — PERFECT BINDING SETTING | PERFECT BINDING SETTING | ON | CHECKBOX +BUTTON | CHECKPERFECTBIND | OFF (CHECKBOX) | – | – |
| 5A6 (5A) — FINISHER | FINISHER | NONE | COMBOBOX | – | NONE | – | – |
| | | FS-521 | | | NONE | – | – |
| | ... | ... | ... | ... | ... | ... | ... |

41 ⌐☐  FOLDING (FINISHING)

FIG. 8B
41 ~  FOLDING (FINISHING)
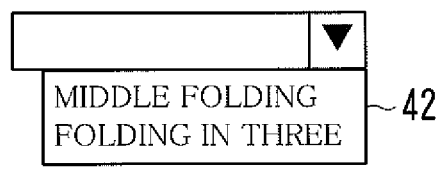 ~42

| CONTROL TYPE | OPERATION AT THE TIME OF RESTRICTION PROCESSING | COMMAND TYPE NUMBER |
|---|---|---|
| CHECKBOX+COMBOBOX | | |
| CHECKBOX | CHANGE <Item(m+n)> FROM <Item(m+n)-value> TO <Item(m+n)-Recover value> | 1 |
| CHECKBOX+BUTTON | | |
| COMBOBOX | | |
| RADIOBUTTON | | |
| BUTTON | GRAY OUT TARGET ITEM | 2 |

| CONTROL TYPE | OPERATION AT THE TIME OF RESTRICTION PROCESSING | COMMAND TYPE NUMBER |
|---|---|---|
| CHECKBOX+COMBOBOX | CHANGE <Item(m+n)> FROM <Item(m+n)-value> TO <Item(m+n)-Recover value>, AND THEN, HIDE VALUE OF COMBO BOX IN <Item(m+n)-value> ON UI. | 3 |
| CHECKBOX | CHANGE <Item(m+n)> FROM <Item(m+n)-value> TO <Item(m+n)-Recover value>, AND THEN, HIDE VALUE OF <Item(m+n)-value> ON UI. | 4 |
| CHECKBOX+BUTTON | | |
| COMBOBOX | CHANGE <Item(m+n)> FROM <Item(m+n)-value> TO <Item(m+n)-Recover value>, AND THEN, GRAY OUT VALUE OF <Item(m+n)-value> ON UI. | 5 |
| RADIOBUTTON | | |
| BUTTON | | |

F I G. 13A

```
THE FOLLOWING COMBINATION
CANNOT BE SET AT ONE TIME.

DOCUMENT ORIENTATION = HORIZONTAL
PAPER SIZE = A3
PUNCH MODE = 3-HOLE
PUNCH POSITION = TOP

THE FOLLOWING COMBINATION
CANNOT BE SET AT ONE TIME.

DOCUMENT ORIENTATION = HORIZONTAL
PAPER SIZE = A3
PUNCH MODE = 3-HOLE
PUNCH POSITION = TOP

DOCUMENT ORIENTATION WILL BE
CHANGED FROM "HORIZONTAL" TO
"VERTICAL".

OK     CANCEL     ~62

| ITEM | CONTROL TYPE | PAIRING CHECKBOX | RECOVER VALUE | PRIORITY ORDER |
|---|---|---|---|---|
| FOLDING | CHECKBOX +COMBOBOX | CHECKFOLD | OFF (CHECKBOX) | 2 |
| PAPER TRAY | COMBOBOX | — | — | 4 |
| SORTING | CHECKBOX | — | — | 4 |
| DOCUMENT ORIENTATION | RADIOBUTTON | — | — | 4 |
| PERFECT BINDING SETTING | CHECKBOX +BUTTON | CHECKPERFECTBIND | OFF (CHECKBOX) | 3 |
| FINISHER | COMBOBOX | — | — | 1 |
| ... | ... | ... | ... | ... |

APPARATUS AND METHOD FOR DETERMINING RESTRICTION AVOIDANCE PROCESSING, AND COMPUTER-READABLE STORAGE MEDIUM FOR COMPUTER PROGRAM

CROSS-REFERENCE TO RELATED APPLICATIONS

This application claims priority under 35 U.S.C. §119(a) to Japanese patent application No. 2015-063203, filed on Mar. 25, 2015. Japanese patent application No. 2015-063203 is incorporated herein by reference in its entirety.

BACKGROUND

1. Field of the Invention

The present invention relates to a technology for avoiding a plurality of conditions which are mutually in a so-called restriction relationship.

2. Description of the Related Art

As image forming apparatuses have grown in performance, items to be set for execution of processing by the image forming apparatuses also increase. Further, a range or option of settable values for one item also increases.

In relation to the increase, it is sometimes forbidden to set, as processing conditions, a value for one item and to set a value for the other item. It is also sometimes forbidden to set a particular value for three or more settings. Such a relationship among the plurality of values is hereinafter referred to as a "restriction relationship".

As a technology related to the restriction relationship, the following technology has been proposed. An image forming apparatus determines a function in conflict with a function being changed in settings. When there is the function in conflict, the image forming apparatus displays the function together with a warning error to show a user the presence of the function in conflict to prompt the user to solve the conflict. When the conflict is eliminated, the settings are applied to printing (English abstract of Japanese Laid-open Patent Publication No. 2014-232503).

The technology described in the Publication enables the image forming apparatus to determine that the restriction relationship has been ended.

Besides, it is sought to avoid such a restriction relationship in advance, or to automatically avoid an existing restriction relationship.

In order to automatically avoid a restriction relationship, a developer needs to preset methods for avoiding such a restriction relationship for each combination of elements which are mutually in a restriction relationship. This increases the number of man-hours for development. In particular, when three elements or more are mutually in a restriction relationship, it is bothersome for the developer to make settings for methods for avoiding the restriction relationship, leading to further increase in the number of development man-hours.

SUMMARY

One or more embodiments of the present invention can avoid a restriction relationship among at least three elements more easily than it is conventionally possible.

According to one aspect of the present invention, a restriction avoidance processing determination apparatus for determining, when values of at least three items are mutually in a restriction relationship where applying the values concurrently are prohibited, avoidance processing for avoiding the restriction relationship is provided. The apparatus includes a storage portion configured to store, therein, degree of importance of each of the at least three items; and a determination portion configured to set one item of the at least three items at a trigger item, determine whether or not the restriction relationship is to be avoided by changing the value of a lower item to another value, the lower item being an item given the degree of importance lower than or equal to the degree of importance of the trigger item, and determine, when the restriction relationship is determined to be avoided, processing of changing the value to the another value as the avoidance processing used when the value is to be set for the trigger item.

In one or more embodiments, when there is a plurality of the lower items, then the determination portion determines whether or not the restriction relationship is to be avoided as follows: by selecting the lower items one by one in ascending order of the degree of importance and determining whether or not the restriction relationship is to be avoided by changing the value of the lower item selected to another value until a positive determination is made a predetermined number of times.

The advantages and features provided by one or more embodiments of the invention will become more fully understood from the detailed description given hereinbelow and the appended drawings which are given by way of illustration only.

BRIEF DESCRIPTION OF THE DRAWINGS

FIG. 3 is a diagram showing an example of relationship among multidimensional item groups.

FIG. 5 is a diagram showing an example of a restriction group table.

FIG. 6 is a diagram showing an example of a priority degree dictionary table.

FIG. 7 is a diagram showing an example of an attribute dictionary table.

FIGS. 8A and 8B are diagrams showing examples of a control.

FIG. 9 is a diagram showing an example of a first restriction processing table.

FIG. 10 is a diagram showing an example of a second restriction processing table.

FIGS. 13A and 13B are diagrams showing examples of a dialog screen.

FIG. 14 is a diagram showing an example of a dictionary table.

DETAILED DESCRIPTION OF EMBODIMENTS

Figure 1:
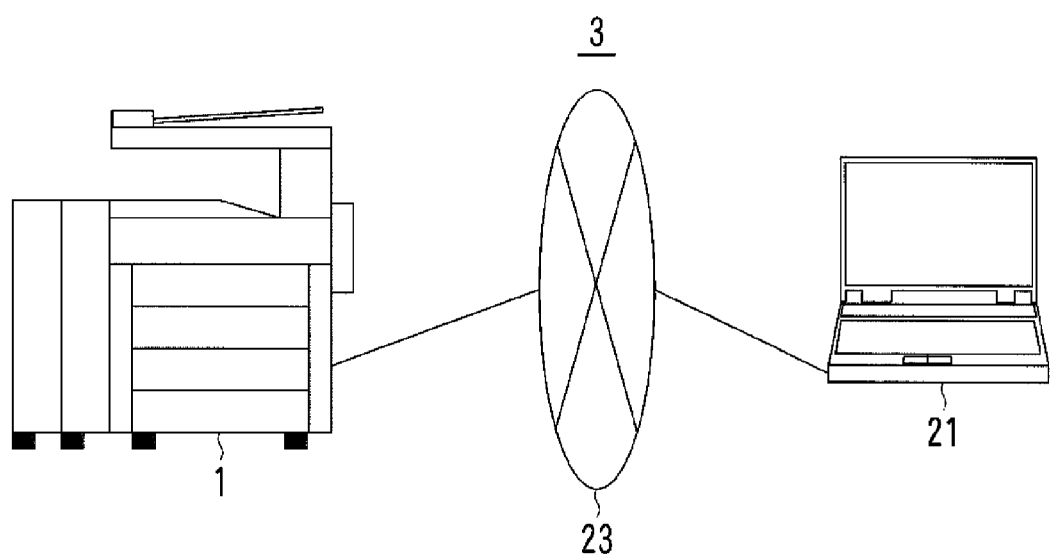
FIG. 1 is a diagram showing an example of the overall configuration of a print system.
Figure 2:
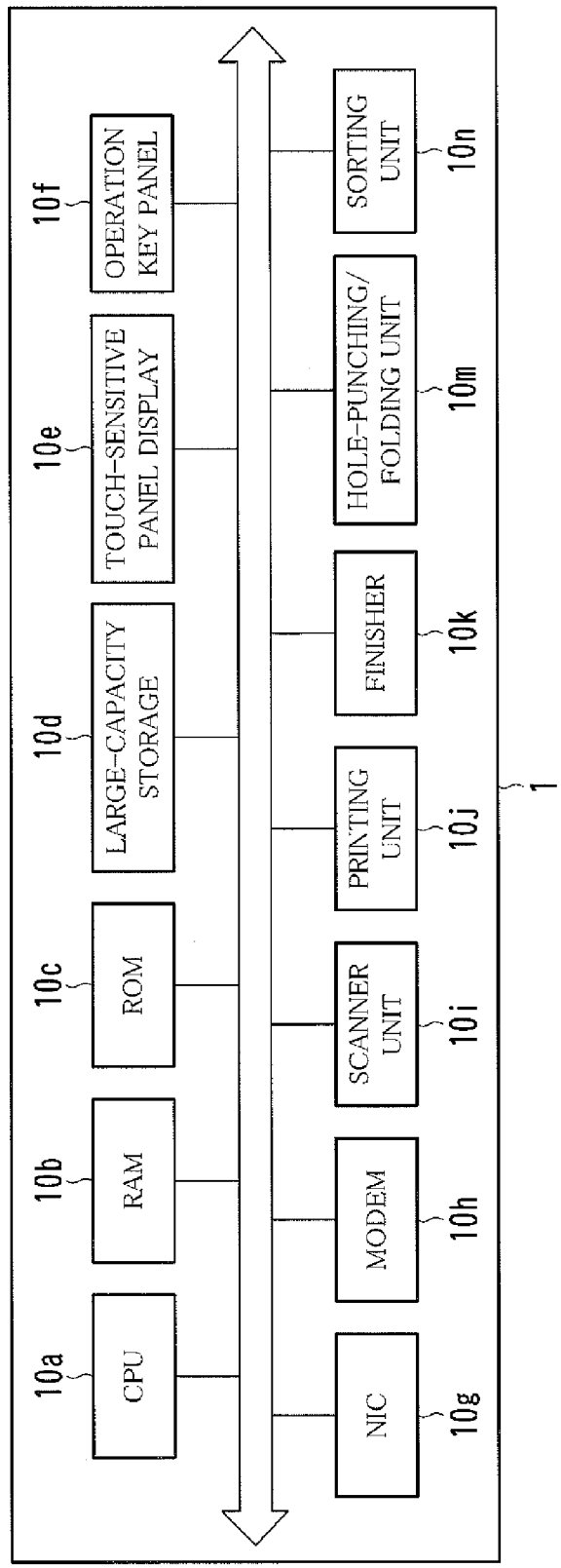
FIG. 2 is a diagram showing an example of the hardware configuration of an image forming apparatus.
Figure 4:
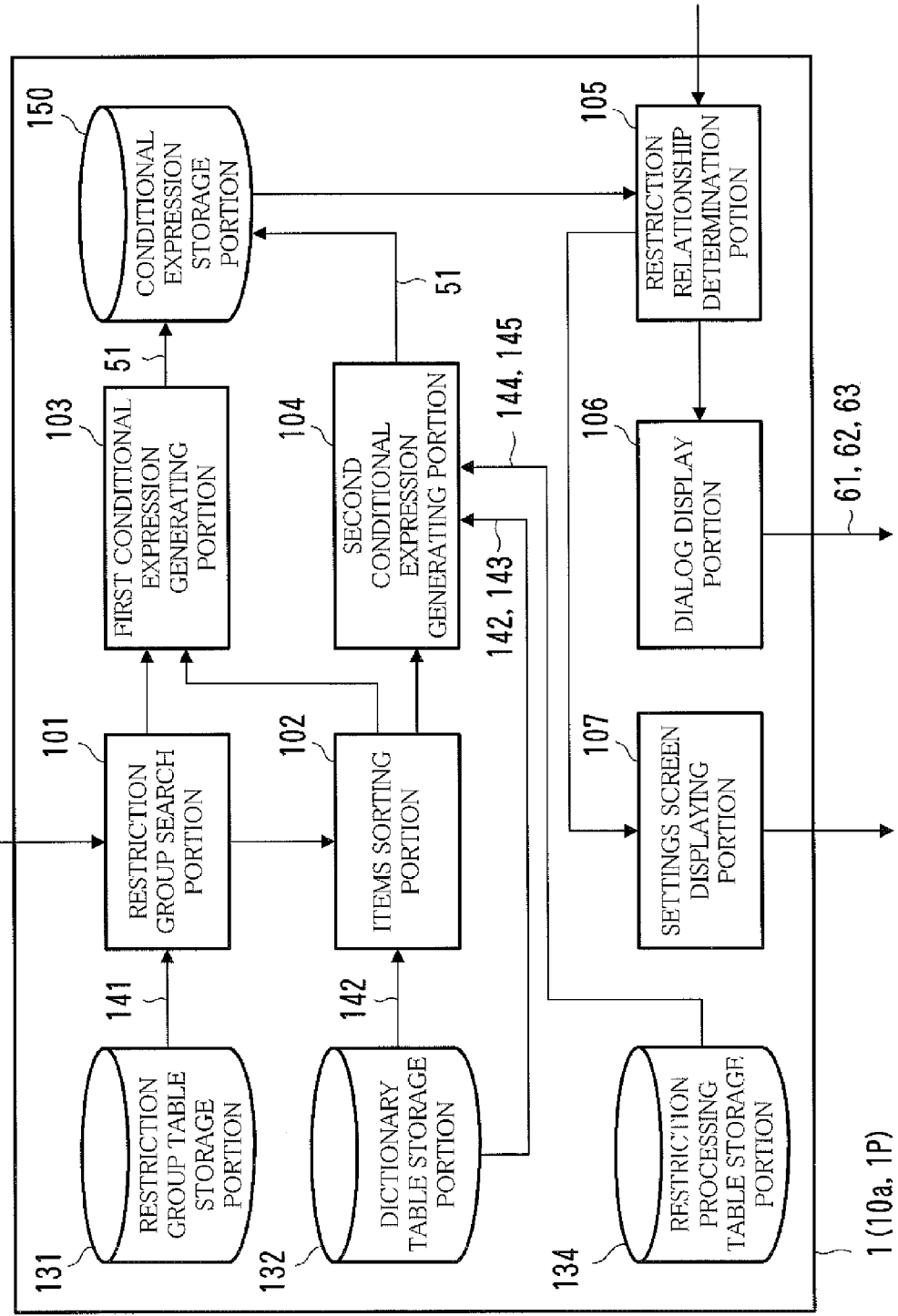
FIG. 4 is a diagram showing an example of the functional configuration of an image forming apparatus.

FIG. 1 is a diagram showing an example of the overall configuration of a print system 3. FIG. 2 is a diagram showing an example of the hardware configuration of an image forming apparatus 1. FIG. 3 is a diagram showing an example of relationship among multidimensional item groups. FIG. 4 is a diagram showing an example of the functional configuration of the image forming apparatus 1.

Referring to FIG. 1, the print system 3 comprises the image forming apparatus 1, a terminal 21, a communication line 23, and so on. The image forming apparatus 1 and the terminal 21 are configured to perform communication with each other via the communication line 23. Examples of the communication line 23 are a so-called Local Area Network (LAN), the Internet, a public line, and a dedicated line.

The image forming apparatus 1 is an apparatus into which functions such as copying, PC printing, faxing, and scanning, are consolidated. The image forming apparatus 1 is usually called a "multifunction device" or a "Multi-Functional Peripheral (MFP)".

The PC printing function is to print an image onto paper based on image data received from the terminal 21. The PC printing function is also called "network printing" or "network print" in some cases.

Referring to FIG. 2, the image forming apparatus 1 comprises a Central Processing Unit (CPU) 10a, a Random Access Memory (RAM) 10b, a Read Only Memory (ROM) 10c, a large-capacity storage 10d, a touch-sensitive panel display 10e, an operation key panel 10f, a Network Interface Card (NIC) 10g, a modem 10h, a scanner unit 10i, a printing unit 10j, a finisher 10k, a hole-punching/folding unit 10m, a sorting unit 10n, and so on.

The touch-sensitive panel display 10e displays, for example, a screen for presenting messages to a user, a screen for allowing the user to input commands or information, a screen for showing results of processing executed by the CPU 10a, and so on. The touch-sensitive panel display 10e sends a signal indicating a touched location to the CPU 10a.

The operation key panel 10f is a so-called hardware keyboard, and is provided with numeric keys, a start key, a stop key, and a function key.

The NIC 10g performs communication with the terminal 21 in accordance with a protocol such as Transmission Control Protocol/Internet Protocol (TCP/IP).

The modem 10h sends and receives image data with a facsimile terminal in accordance with a protocol such as G3.

The scanner unit 10i optically reads an image recorded on a sheet of paper placed on a platen glass to generate image data thereof.

The printing unit 10j prints, onto paper, an image captured by the scanner unit 10i and an image received from other devices by the NIC 10g or the modem 10h.

The finisher 10k staples, with a stapler, a plurality of sheets of paper onto which the printing unit 10j has printed an image (hereinafter, referred to as a "printed matter"). In short, the finisher 10k performs stapling. The image forming apparatus 1 may be provided with different models of finishers 10k.

The hole-punching/folding unit 10m punches a hole in a printed matter or folds a printed matter. The hole-punching/folding unit 10m may perform both the hole-punching and the folding. In one or more embodiments, both the processing of hole-punching and folding is performed by the hole-punching/folding unit 10m. Instead of this, however, the hole-punching processing and the folding processing may be performed by separate devices.

The sorting unit 10n sorts sheets of printed matter by discharging the sheets to any of paper trays.

The ROM 10c or the large-capacity storage 10d stores, therein, programs for implementing the foregoing functions such as copying. The programs are loaded into the RAM 10b as necessary and executed by the CPU 10a. Examples of the large-capacity storage 10d are a hard disk drive and a Solid State Drive (SSD).

The terminal 21 is a client of the image forming apparatus 1. The user operates the terminal 21 to use the variety of functions of the image forming apparatus 1 remotely. Examples of the terminal 21 are a laptop computer, a desktop computer, a smartphone, and a tablet computer.

In the meantime, when the forgoing functions of the image forming apparatus 1 are used, settings are made for various items. For example, settings for printing include: settings for paper size and settings for paper orientation. Settings for applying a finish to a printed matter include: selection of the finisher 10k to be used for stapling; settings as to whether or not to perform stapling; settings as to whether or not to perform hole-punching; settings for punch hole position; settings for the number of punch holes; settings as to whether or not to perform folding; settings for types of folding; settings as to whether or not to perform sorting; and settings for sort destinations.

However, such settings are not always allowed to be made freely. To be specific, when a certain value (condition) is set in a certain item, values settable in other items are sometimes restricted. Such a relationship is hereinafter referred to as a "restriction relationship".

A combination in which a restriction relationship holds is not limited to a combination of values in two items. A restriction relationship sometimes holds in a combination of three items or more.

For example, as shown in FIG. 3, out of M items listed in the transverse direction and N items listed in the longitudinal direction, namely, out of the total (M+N) items, values of, at maximum, (M+N) items are sometimes in a restriction relationship. Stated differently, in some cases, the values are mutually in a so-called multi-dimensional restriction relationship.

Referring to FIG. 3, items of one dimension cannot be combined with one another for design reasons in the image forming apparatus 1. For example, Item X11 and Item X12 cannot be combined with each other because both the Item X11 and Item X12 belong to a dimension X1.

In addition, the design of the image forming apparatus 1 does not allow items of a part of different dimensions to be combined with one another. For example, although Item X12 and Item X21 belong to dimensions different from each other, both the item X12 and the item X21 cannot be combined with each other for design reasons in the image forming apparatus 1.

In the table, "N/A", which stands for "Not Applicable", means that no restriction relationship holds, and "A", which stands for "Applicable", means that values are mutually in a restriction relationship.

For example, attention is focused on "N/A" enclosed by a thick frame in the second column from the right and the third row from the top. The "N/A" means that no restriction relationship holds in a value "x112" of "Item X11", a value "x221" of "Item X22", . . . , a value "xm21" of "Item XM2", a value "y122" of "Item Y12", a value "y221" of "Item Y22", . . . , and a value "yN21" of "Item YN2". Further, attention is focused on "A" enclosed by a thick frame in the fifth column from the right and the bottom row. The "A" means that a restriction relationship holds in a value "x122" of "Item X12", . . . , a value "xm22" of "Item XM2", a value "y112" of "Item Y11", . . . , and a value "yN22" of "Item YN2".

Hereinafter, a group of values of items in which a restriction relationship holds is referred to as a "restriction group". Setting values in accordance with a group in which a restriction relationship holds is prohibited.

There are many restriction groups in the image forming apparatus 1. In order to identify such restriction groups and to generate an expression indicating a condition for avoiding the restriction groups, the large-capacity storage 10d stores, therein, a restriction avoidance conditional expression generating program 1P. Such an expression is hereinafter referred to as a "restriction avoidance conditional expression".

As with the other programs, the restriction avoidance conditional expression generating program 1P is loaded into the RAM 10b and executed by the CPU 10a as discussed above. The restriction avoidance conditional expression generating program 1P is hereinafter described by taking an example in which items related to image printing and finishing on a printed matter are handled.

The restriction avoidance conditional expression generating program 1P implements a restriction group search portion 101, an items sorting portion 102, a first conditional expression generating portion 103, a second conditional expression generating portion 104, a restriction relationship determination portion 105, a dialog display portion 106, a settings screen displaying portion 107, a restriction group table storage portion 131, a dictionary table storage portion 132, a restriction processing table storage portion 134, and so on, all of which are shown in FIG. 4.

[Data Preparation]

Figure 8A:

FIG. 5 is a diagram showing an example of a restriction group table 141. FIG. 6 is a diagram showing an example of a priority degree dictionary table 142. FIG. 7 is a diagram showing an example of an attribute dictionary table 143. FIGS. 8A and 8B are diagrams showing examples of a control. FIG. 9 is a diagram showing an example of a first restriction processing table 144. FIG. 10 is a diagram showing an example of a second restriction processing table 145.

Referring to FIG. 4, the restriction group table storage portion 131 stores a restriction group table therein. An example of the restriction group table is the table, shown in FIG. 3, which indicates the presence or absence of a restriction relationship for each group of values of items. The following description takes an example in which the restriction group table 141 which is a restriction group table shown in FIG. 5 for making settings for finishing of punching a hole.

The restriction group table 141 indicates four items of "paper size", "document orientation", "punch mode", and "punch position".

The paper size shows a size of a printed matter in which a hole is to be punched. The item "paper size" has any one of values of "A3" and "A4" which mean paper size A3 and paper size A4, respectively. The punch mode shows the number of holes to be punched in a printed matter. The punch position shows a position on paper at which a hole is to be punched.

The document orientation shows orientation of a printed matter. The item "document orientation" has any one of values of "vertical" and "horizontal" which mean that the document is oriented vertically (portrait) and is oriented horizontally (landscape), respectively.

Referring back to FIG. 4, the dictionary table storage portion 132 stores, therein, the priority degree dictionary table 142 and the attribute dictionary table 143.

As shown in FIG. 6, the priority degree dictionary table 142 indicates degrees of priority of items. The "degree of priority" means the priority order of a value of an item which takes precedence over the other items in view of avoidance of a restriction relationship. To be specific, the lower degree of priority an item has, the more the item is subjected to processing of changing the value to another value in order to avoid a restriction relationship. The degree of priority may be called "degree of importance". A higher degree of priority is set for an item which may take precedence over the other items. The degree of priority becomes higher as the number of priority becomes smaller.

As shown in FIG. 7, the attribute dictionary table 143 stores, therein, attribute data 5A for each item. Hereinafter, the attribute data 5A may be described separately as "attribute data 5A1", "attribute data 5A2", . . . , and so on.

In the attribute data 5A, a "settable value" is a value that can be set in the corresponding item.

A "Recover Value" is a candidate value for the case where settable values are so changed that no restriction relationship holds. Stated differently, the "Recover Value" is a candidate value which turns the settable items from the restriction relationship to a normal state. Some settable values have only one Recover Value; others have a plurality of settable values. In the former case, a candidate value is shown in "Recover Value 1". In the latter case, candidate values are shown in "Recover Value 1", "Recover Value 2", . . . and so on in descending order of priority.

A "control type" is the type of a control used to set a value on the corresponding item.

The "control" is a display component (object) for receiving an input of information or command. A combination of controls is sometimes used to make settings for one item.

In the control type, "ComboBox", "CheckBox", "RadioButton", and "Button" mean that known combo box, checkbox, radio button, and button in, for example, a Hypertext Markup Language (HTML) are used respectively as the controls.

A "Pairing CheckBox" shows, in a case where the control type is a combination (pair) of CheckBox and another control, an identifier of the CheckBox.

For example, as to the item "Folding", the control type is "CheckBox+ComboBox" which means that a combination of a checkbox and a combo box is used as the control. For example, a checkbox 41 and a combo box 42 are used as the control as shown in FIG. 8A. If the checkbox 41 is given an identifier "CheckFold", then "CheckFold" is set as a Check-Box to make a pair as shown in the attribute data 5A1. If the checkbox 41 is checked and a triangle button is selected, then a drop-down list appears which shows options of "middle folding" and "folding in three" as shown in FIG. 8B.

The priority degree dictionary table 142 shows degrees of priority of paper size, punch mode, and punch position, in addition to the degrees of priority of the individual items shown in FIG. 6. Likewise, the attribute dictionary table 143 shows attribute data 5A of paper size, punch mode, and punch position, in addition to the attribute data 5A of the individual items shown in FIG. 7.

Referring back to FIG. 4, the restriction processing table storage portion 134 stores, therein, a first restriction processing table 144 and a second restriction processing table 145.

Referring to FIG. 9, the first restriction processing table 144 shows, for each control type, what kind of processing is to be executed as restriction processing (processing to avoid a restriction relationship) and a number for identifying the processing (command type number).

Referring to FIG. 10, the second restriction processing table 145 shows, for each control type, restriction processing and command type number.

The restriction group table 141, the priority degree dictionary table 142, the attribute dictionary table 143, the first restriction processing table 144, and the second restriction processing table 145 are prepared by a developer of the image forming apparatus 1.

[Generation of Restriction Avoidance Conditional Expression]

Figure 11:
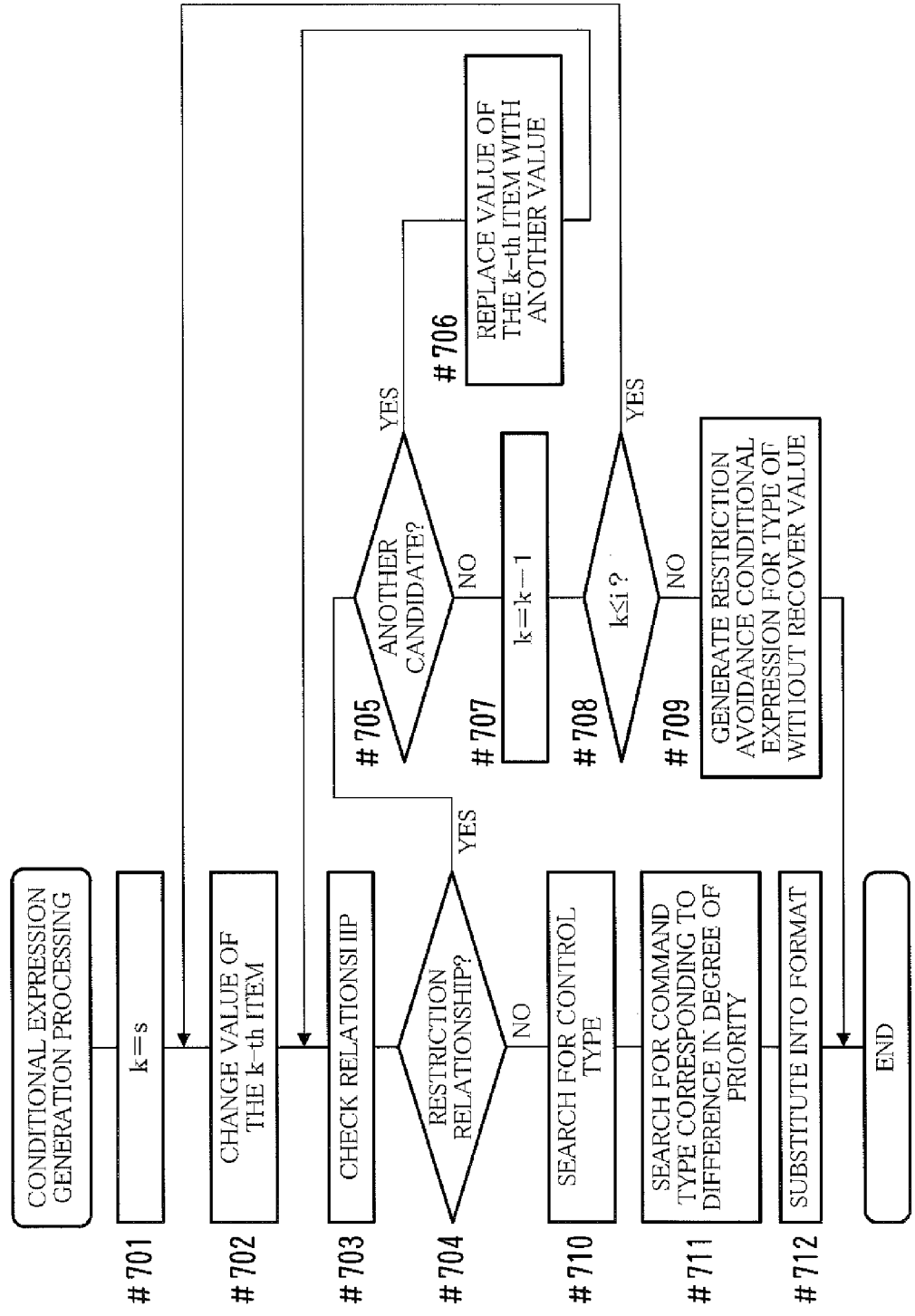
FIG. 11 is a flowchart depicting an example of the flow of conditional expression generation processing.

FIG. 11 is a flowchart depicting an example of the flow of conditional expression generation processing.

The restriction group search portion 101 searches a restriction group (group having a restriction relationship, namely, a pair denoted by "A") from among the groups shown in the restriction group table 141 (see FIG. 5).

When the restriction group is found out by the search by the restriction group search portion 101, the items sorting portion 102 sorts items constituting the restriction group in descending order of degrees of priority indicated in the priority degree dictionary table 142 (see FIG. 6).

Supposing that, for example, a restriction group is found out which corresponds to "A" enclosed by a thick frame in the third column from the right and the second row from the top (see FIG. 5). In such a case, the items of paper size, document orientation, punch mode, and punch position are sorted in descending order of degrees of priority, i.e., in the order of paper size, punch mode, punch position and document orientation. If there are items given the same degree of priority as one another, such items may be sorted in any order.

The items sorting portion 102 then prioritizes the items in descending order of degrees of priority and applies ranking numbers "1", "2", . . . , and so on to the items. If some items have the same degree of priority as one another, then such items are given the same ranking number. In the foregoing example, the paper size and the punch mode are given the same degree of priority as each other. The items sorting portion 102 then applies the ranking numbers "1", "1", "3", and "4" to paper size, punch mode, punch position, and document orientation, respectively.

The first conditional expression generating portion 103 and the second conditional expression generating portion 104 generate a restriction avoidance conditional expression for the restriction group found out by the restriction group search portion 101 in accordance with the result by the items sorting portion 102.

In the meantime, the restriction avoidance conditional expression has the format shown in the following expression (1).

<Item1>,<Index>=<Type>,<Item1-value>,<Item2>,
    <Item2-value>,<Item2-Recover
    Value>, . . . ,<Item(M+N)>,<Item(M+N)-
    value>,<Item1-Recover Value>   (1)

Elements of the left side show the following: <Item1> is a trigger item; and <Index> is a number for identifying the restriction avoidance conditional expression, e.g., a sequence number such as 1, 2, 3, . . . , and so on.

The "trigger item" is an item, of items in the restriction group, for which a value is to be set. Further, a "target item" described later is an item, of items in the restriction group, for which settings have already been made in advance of the trigger item.

Elements of the right side show the following: <Item2>, . . . , and <Item(M+N)> are items other than the trigger item of items in the restriction group; and <Item2>, . . . , and <Item(M+N)> show items in descending order of degrees of priority from the left (top).

<ItemK- value> is a value of <ItemK> wherein 1≤K≤ (m+n). For example, <Item2- value> is a value of <Item2>, and "m+n" is a dimensional number. In the restriction group table 141 (see FIG. 5), the dimensional number is "4".

To be specific, if <Item1-Value> is set in <Item1>, then a restriction relationship holds in a group of <Item1-value>, <Item2-value>, . . . , and <Item(M+N)-value>.

<Type> is a command type number of the foregoing restriction processing. In some cases, however, <Type> is not included in the restriction avoidance conditional expression.

<ItemL-Recover Value> is a value of <ItemL> which enables avoidance of the restriction relationship from this restriction group. It is noted that 2≤L≤(M+N). To be specific, changing <ItemL-value> to <ItemL-Recover Value> can avoid the restriction relationship. However, all of <ItemL> do not include <ItemL-Recover Value>. Some <ItemL> include no <ItemL-Recover Value>.

When there is a single item having a lowest degree of priority in the restriction group found out by the restriction group search portion 101, the first conditional expression generating portion 103 generates a restriction avoidance conditional expression for the case where that item is the trigger item and the other items are target items in the following manner.

The first conditional expression generating portion 103 substitutes an identifier (item name, for example) of the item (trigger item) for <Item1> in the left-hand side of the expression (1), and further substitutes the smallest number of numbers which have not yet been issued for <Index>.

The first conditional expression generating portion 103 then deletes <Type> in the right-hand side of the expression (1). Alternatively, the first conditional expression generating portion 103 may substitute, for <Type>, a number showing that no restriction processing is to be performed. The first conditional expression generating portion 103 then substitutes item names of items other than the trigger item (the remaining items) for <Item2>, . . . , and <Item(m+n)> in descending order of ranking. The first conditional expression generating portion 103 also deletes <Item2-Recover Value>, . . . , and <Item(M+N)-Recover Value>.

For example, as for the foregoing item values, e.g., the value "A3" of item "paper size", the value "horizontal" of item "document orientation", the value "3-hole" of item "punch mode", and the value "top" of item "punch position" (corresponding to restriction group enclosed by the thick frame in FIG. 5), the items sorting portion 102 sorts the item values in descending order of degrees of priority, namely, in the order of the value "A3" of item "paper size", the value "3-hole" of item "punch mode", the value "top" of item "punch position", and the value "horizontal" of item "document orientation". In addition, in the restriction group, the document orientation is only one item given a lowest degree of priority.

Thus, the first conditional expression generating portion 103 performs the foregoing processing to generate, as the restriction avoidance conditional expression, the following expression (2).

document orientation,1=horizontal,paper size,A3,
    punch mode,3-hole,punch position,top   (2)

As noted above, the restriction avoidance conditional expression for the case where a single item given a lowest degree of priority is the trigger item and the other items are target items does not show any conditions for restriction processing. Therefore, for avoidance of a restriction relationship, a user has to set another value for the trigger item as described later.

The second conditional expression generating portion 104 generates a restriction avoidance conditional expression for the case where items other than the single item given a lowest degree of priority of the restriction group found out by the restriction group search portion 101 are trigger items and the remaining items are target items. A method for generating such a restriction avoidance conditional expression is depicted in the flowchart of FIG. 11.

Referring to FIG. 11, the second conditional expression generating portion 104 makes an item given a lowest ranking number as a target (Step #701). The second conditional expression generating portion 104 reads out attribute data 5A of the item made as a target (hereinafter, referred to as "item of interest") from the attribute dictionary table 143 (see FIG. 7), and replaces a value of the item of interest in the restriction group with the Recover Value 1 indicated in the attribute data 5A thus read out (Step #702).

For example, if the item of interest is "document orientation" and the value thereof is "horizontal", then the second conditional expression generating portion 104 reads out attribute data 5A4. Referring to the attribute data 5A4, the Recover Value 1 corresponding to the settable value "horizontal" is "vertical". The second conditional expression generating portion 104 thus replaces the value of the item of interest with "vertical".

The second conditional expression generating portion 104 then determines whether or not the replacement processing of Step #702 ends the restriction relationship in the restriction group (Step #703). The determination may be performed based on the restriction group table 141 (see FIG. 5).

For example, concerning the group having a value "A3" in the item "paper size", a value of "horizontal" in the item "document orientation", a value of "3-hole" in the item "punch mode", a value of "top" in the item "punch position" (see the thick frame of FIG. 5), the value "horizontal" in the item "document orientation" is changed to "vertical" through the processing of Step #702. As shown in a cell upwardly adjacent to the cell enclosed by the thick frame, the post-replacement group has no restriction relationship. The second conditional expression generating portion 104 thus determines that the restriction relationship is to be ended.

If the replacement ends the restriction relationship (No in Step #704), then the second conditional expression generating portion 104 generates, as the restriction avoidance conditional expression, a conditional expression for making a combination of post-replacement values (Steps #710-#712). This will be described later.

If the restriction relationship is still held after the replacement (YES in Step #704), then the second conditional expression generating portion 104 replaces the value of the item of interest with another Recover Value (Step #706), as long as the attribute data 5A thus read out indicates another Recover Value (YES in Step #705). The process goes back to Step #703 and a determination is made as to whether or not the restriction relationship is ended in the restriction group. If there are other Recover Values, then the replacement is performed in the order of Recover Value 2, Recover Value 3, . . . and so on.

If the restriction relationship is still held even if the value of the item of interest is replaced with every Recover Value (YES in Step #704 and NO in Step #705), then the second conditional expression generating portion 104 makes, as a target, an item given a ranking number one higher than that of the current item of interest (Step #707). It is noted that the replaced values are turned back to the original values. If there is another item which is given the same ranking number as that of the current item of interest and has not yet been made as a target, then that another item is made as a new target.

The second conditional expression generating portion 104 then performs the processing of Steps #702-#706 appropriately. In short, the second conditional expression generating portion 104 replaces values of the new item of interest with Recover Value 1, Recover Value 2, . . . , and so on until the restriction relationship is ended.

The second conditional expression generating portion 104 continues the processing of Steps #702-#706 until the restriction relationship is ended. In this way, items are made as targets, one by one, in ascending order of ranking.

The restriction relationship still remains (NO in Step #708) even if an item given the same ranking number as that of the trigger item is made as a target and the processing of Steps #702-706 is performed, then the second conditional expression generating portion 104 generates a restriction avoidance conditional expression in the same manner as that by the first conditional expression generating portion 103 (Step #709).

To be specific, the second conditional expression generating portion 104 substitutes an identifier of the item (trigger item) for <Item1> in the left-hand side of the expression (1), and further substitutes, for <Index>, the smallest number of numbers which have not yet been issued. The second conditional expression generating portion 104 then deletes <Type> in the right-hand side of the expression (1), or, alternatively, substitutes, for <Type>, the number showing that no restriction processing is to be performed. The second conditional expression generating portion 104 then substitutes, for <Item2>, . . . , and <Item(m+n)>, item names of items other than the trigger item (the remaining items) in descending order of degrees of priority. The second conditional expression generating portion 104 also deletes <Item2-Recover Value>, . . . , and <Item(m+n)-Recover Value>.

On the other hand, if the restriction relationship is ended by replacing a value of the item of interest with a Recover Value (NO in Step #704), then the second conditional expression generating portion 104 generates a restriction avoidance conditional expression as follows.

The second conditional expression generating portion 104 searches for a control type in the attribute data 5A of the item of interest (Step #710). Thereby, in the case where the attribute data 5A of the item of interest is attribute data 5A4, then the control type "RADIOBUTTON" is found out by the search.

The second conditional expression generating portion 104 reads out (Step #711) a command type number corresponding to the control type found out by the search from the first restriction processing table 144 (see FIG. 9) or the second restriction processing table 145 (see FIG. 10). To be specific, if the degree of priority of the trigger item is the same as that of the item of interest, then the second conditional expression generating portion 104 reads out the command type number from the first restriction processing table 144. Otherwise, the second conditional expression generating portion 104 reads out the command type number from the second restriction processing table 145.

The second conditional expression generating portion 104 generates a restriction avoidance conditional expression by substituting a post-replacement value of the item of interest and the command type number read out for the expression (1) as follows (Step #712).

As with the foregoing case, the second conditional expression generating portion 104 substitutes, for <Item 1>, an identifier of the trigger item in the left-hand side of the expression (1). Among the numbers having not yet been issued, the smallest number is substituted for <Index>. As with the foregoing case, the second conditional expression generating portion 104 substitutes item names of items other than the trigger item (the remaining items) for <Item2>, . . . , and <Item(m+n)> in the right-hand side in descending order of degrees of priority.

The second conditional expression generating portion 104 further substitutes the command type number thus read out for <Type> in the right-hand side. The second conditional expression generating portion 104 substitutes the post-replacement value (value causing no restriction relationship) for values related to item of interest among <Item2-Recover Value>, . . . , and <Item(m+n)-Recover Value>. The other values are deleted.

In the foregoing example in which the item "paper size" has a value of "A3", the item "document orientation" has a value of "horizontal", the item "punch mode" has a value of "3-hole", and the item "punch position" has a value of "top" (see the thick frame of FIG. 5), one restriction avoidance conditional expression has already been generated; and, if the command type number is "5", and if the item of interest is punch position, then the restriction avoidance conditional expression as shown in the expression (3) is generated through the processing of FIG. 11.

Punch position,2=5,top,punch mode,3-hole,paper size,A3,document orientation,horizontal,vertical    (3)

As discussed above, the first conditional expression generating portion 103 generates a restriction avoidance conditional expression for a single item given a lowest degree of priority in the restriction group. The second conditional expression generating portion 104 generates a restriction avoidance conditional expression for the remaining items.

When the restriction avoidance conditional expression is generated by the first conditional expression generating portion 103 or the second conditional expression generating portion 104, conditional expression data 51 showing the restriction avoidance conditional expression is stored in the conditional expression storage portion 150.

Figure 12:
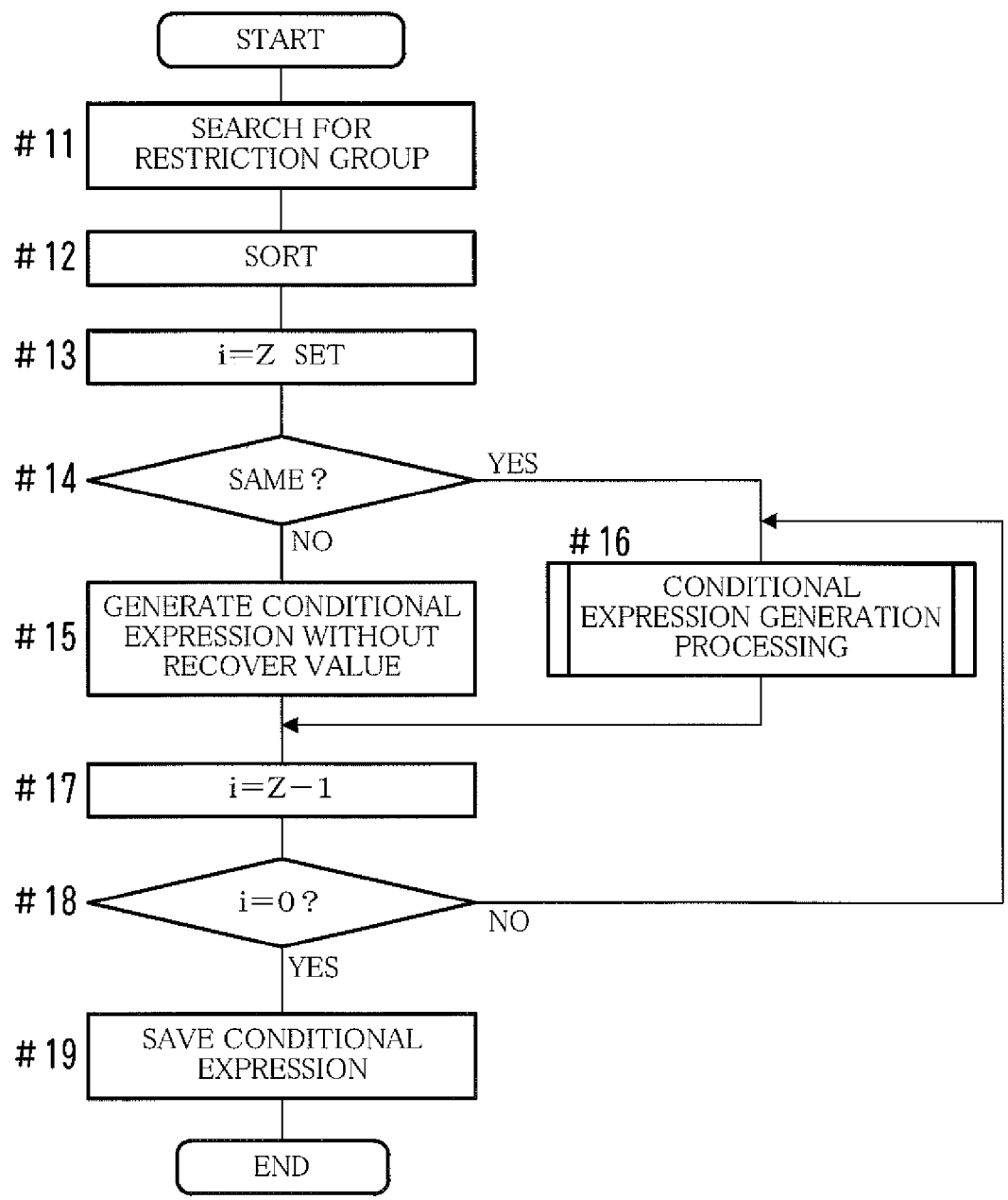
FIG. 12 is a flowchart depicting an example of the flow of the entire processing for generating a restriction avoidance conditional expression.

FIG. 12 is a flowchart depicting an example of the flow of the entire processing for generating a restriction avoidance conditional expression.

The description goes on to the flow of the entire processing performed by the image forming apparatus 1 based on the restriction avoidance conditional expression generating program 1P with reference to FIG. 12.

According to the restriction avoidance conditional expression generating program 1P, the image forming apparatus 1 performs processing for generating a restriction avoidance conditional expression in the steps shown in FIG. 12.

The image forming apparatus 1 searches for a restriction group in the restriction group table 141 (see FIG. 5) (Step #11). If a restriction group is found out by the search, then items constituting the restriction group are sorted in descending order of degrees of priority (Step #12). The degree of priority of each of the items is based on the priority degree dictionary table 142 (see FIG. 6).

The image forming apparatus 1 selects an item given a lowest ranking number from among the restriction group (Step #13). The image forming apparatus 1 then generates a restriction avoidance conditional expression for the case where the selected item is a trigger item and the other items are target items. In Step #13, "Z" represents the number of dimensions of the restriction group, and "Z" is "4" in the case of the restriction group table 141.

If the selected item is a single item given a lowest priority (NO in Step #14), then the image forming apparatus 1 generates a restriction avoidance conditional expression without the command type number and the Recover Value (Step #15). The restriction avoidance conditional expression is, for example, the expression (2) described earlier.

On the other hand, if there is an item given the same degree of priority as that of the selected item (YES in Step #14), then the image forming apparatus 1 attempts to generate a restriction avoidance conditional expression including a command type number and a Recover Value (Step #16). The steps of generating the restriction avoidance conditional expression are described above with reference to FIG. 11. The restriction avoidance conditional expression is, for example, the expression (3) described earlier. Depending on the result of processing in Step #16, in some cases, the restriction avoidance conditional expression without a command type number and a Recover Value is generated.

The image forming apparatus 1 selects an item given the second lowest ranking number from among the restriction group (Step #17). The image forming apparatus 1 then generates a restriction avoidance conditional expression with the currently selected item used as a trigger item and another item used as a target item (Step #16).

The image forming apparatus 1 repeats the foregoing processing steps to generate a restriction avoidance conditional expression for the case where each of the items of the restriction group is a trigger item and the other items are target items.

The image forming apparatus 1 then stores, into the conditional expression storage portion 150, data indicating each of the generated restriction avoidance conditional expressions as the conditional expression data 51 (Step #19).

[How to Use Restriction Avoidance Conditional Expression]

FIGS. 13A and 13B are diagrams showing examples of dialog screens 61 and 62.

The image forming apparatus 1 uses the restriction avoidance conditional expression generated by the restriction avoidance conditional expression generating program 1P in the following manner.

When a user enters a value for an item, the restriction relationship determination potion 105 shown in FIG. 4 determines, based on the restriction group table 141 (refer to FIG. 5), whether or not a restriction relationship holds between the value of the item and a group including values of items already set. Alternatively, the restriction relationship determination potion 105 may make such a determination based on a restriction avoidance conditional expression indicated in each set of the conditional expression data 51 stored in the conditional expression storage portion 150.

If the restriction relationship holds, then the group corresponds to the restriction group. Therefore, conditional expression data 51 which indicates a restriction avoidance conditional expression of the group is supposed to be stored in the conditional expression storage portion 150.

In view of this, the dialog display portion 106 reads out the conditional expression data 51 from the conditional expression storage portion 150, and displays, based on the restriction avoidance conditional expression, the screen described below on the touch-sensitive panel display 10e.

If neither the command type number nor the Recover Value is shown in the restriction avoidance conditional expression, specifically, if the restriction avoidance conditional expression is the restriction avoidance conditional expression as that shown in the expression (2), then the dialog display portion 106 displays the dialog screen 61 as shown in FIG. 13A.

On the dialog screen 61, members of the group (restriction group) and a message to the effect that the members are not settable concurrently are displayed. Then, the entry this time is denied. In short, the user cannot set the value entered this time.

On the other hand, if the command type number and the Recover Value are shown in the restriction avoidance conditional expression, specifically, if the restriction avoidance conditional expression is the restriction avoidance conditional expression as that shown in the expression (3), then the dialog display portion 106 displays the dialog screen 62 as shown in FIG. 13B.

As with the dialog screen 61, members of the group and a message to the effect that the members are not settable concurrently appear on the dialog screen 62. Further, a message to suggest making a change to avoid a restriction relationship appears on the dialog screen 62. The message suggests a change based on the Recover Value and items related thereto. In the case of the expression (3), "vertical" is the Recover Value in the right-hand side of " . . . , document orientation, horizontal, and vertical", and "document orientation" is the item.

When an OK button 621 is selected, the entry this time is accepted and set. In keeping with the suggestion, specifically, in accordance with the restriction avoidance conditional expression, the value that has already been set is set again. For example, in the case of the expression (3), the value of document orientation is set at "vertical". This is a kind of the restriction processing.

If there is another restriction processing corresponding to the command type number, then such processing is performed. For example, if the restriction processing is gray out processing on a control, then the settings screen displaying portion 107 grays out (displays the control so as to be unselectable) the control corresponding to an item for which the value has been set again and then displays a setting screen. This makes it impossible for the user to set again the item. Further, depending on the control type, the settings screen displaying portion 107 performs, as the restriction processing, processing for hiding options of a value relating to the restriction group, and so on. The details of the restriction processing are shown in the first restriction processing table 144 of FIG. 9 or in the second restriction processing table 145 of FIG. 10.

When a cancel button 622 is selected in FIG. 13B, the entry this time is denied. Neither setting of value again nor restriction processing is performed.

According to one or more embodiments, it is possible to determine a method for avoiding a restriction relationship among values of at least three items more easily than is conventionally possible.

Figure 15A:
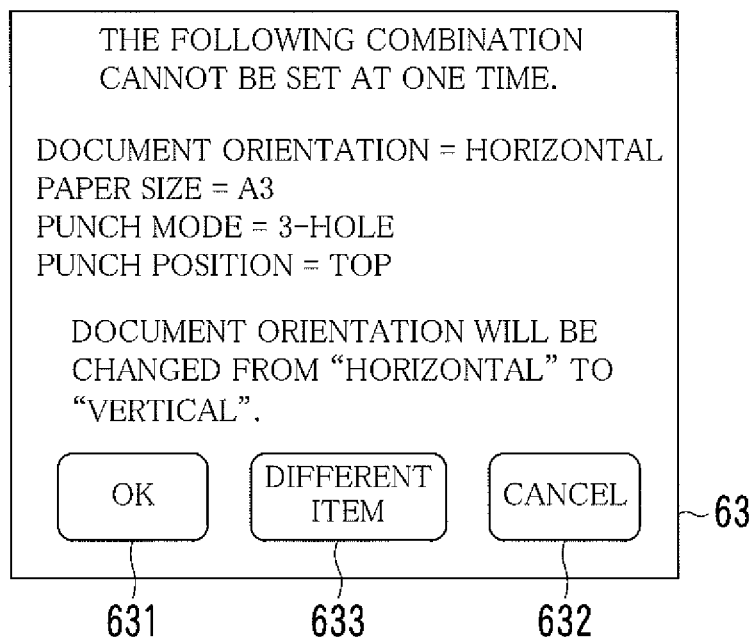
FIGS. 15A and 15B are diagrams showing examples of a dialog screen.
Figure 15B:
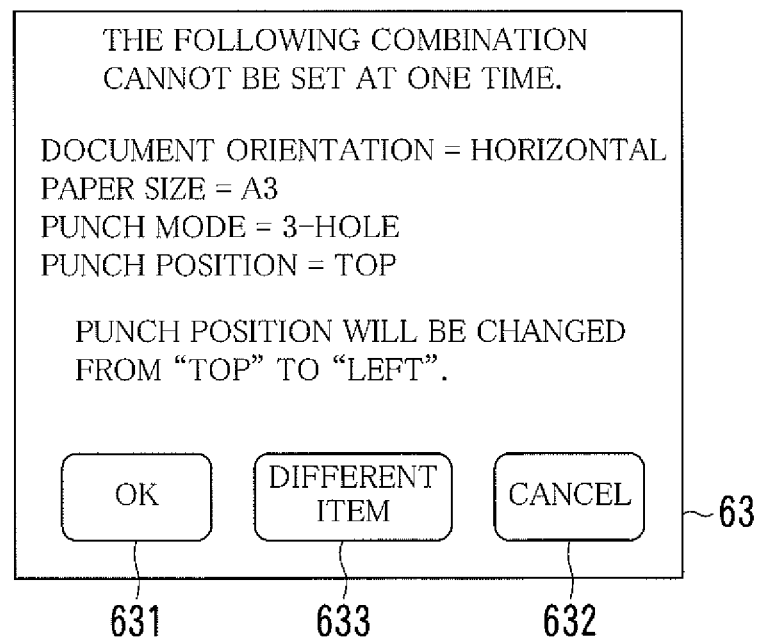

FIG. 14 is a diagram showing an example of a dictionary table 146. FIGS. 15A and 15B are diagrams showing examples of a dialog screen 63.

In one or more embodiments, Recover Values are defined in the attribute dictionary table 143, as shown in FIG. 7, for each combination of an item and values settable for the item (settable values). Further, the degree of priority is defined for each item in the priority degree dictionary table 142 as shown in FIG. 6.

Instead of this, however, it is also possible to define, for one item, Recover Values common to all settable values settable for the item as shown in the dictionary table 146 of FIG. 14. It is also possible to define the degree of priority in the dictionary table 146. The dictionary table 146 may be used to perform the processing for generating a restriction avoidance conditional expression as discussed above.

When the dictionary table 146 is used, however, no Recover Values are shown in some items. When such an item is an item of interest, the second conditional expression generating portion 104 (see FIG. 4) changes a value of the item of interest arbitrarily to obtain a value which causes no restriction relationship.

In one or more embodiments, restriction avoidance conditional expressions are generated collectively for all of restriction groups and the generated restriction avoidance conditional expressions are used. In short, the restriction avoidance conditional expressions are statically generated and used. Instead of this, however, at a time when the user enters, as processing conditions, a restriction group into the image forming apparatus 1, the restriction avoidance conditional expression may be dynamically generated depending on the environment and used. In such a case, the image forming apparatus 1 may perform processing as follows.

The user enters, on a setting screen, values (conditions, settable values) for some items. In response to this operation, the image forming apparatus 1 determines whether or not the values of the items correspond to a restriction group based on the restriction group table 141 (see FIG. 5). If the determination is positive, then a restriction avoidance conditional expression is generated. The steps for generating are described earlier with reference to FIG. 11. At this time, the restriction avoidance conditional expression may be generated only when an item into which the user is to enter a value is a trigger item. Then, based on the generated restriction avoidance conditional expression, processing for avoiding the restriction relationship is performed.

The following variation is applicable not only to the case where a restriction avoidance conditional expression is statically generated for use also to the case where a restriction avoidance conditional expression is dynamically generated for use.

In one or more embodiments, only one restriction avoidance conditional expression is generated for one item of a restriction group. Instead of this, however, a predetermined number of restriction avoidance conditional expressions may be generated. In such a case, the processing of Steps #703-#708 and the processing of Steps #710-#712 of FIG. 11 are performed until the predetermined number of restriction avoidance conditional expressions are obtained. Alternatively, restriction avoidance conditional expressions may be generated by using, as items of interest, in order, other items given degrees of priority lower than the degree of priority of the item or other items given the same priority as that of the item.

The image forming apparatus 1 may use the restriction avoidance conditional expressions in the following manner. When a user enters a value for an item, the image forming apparatus 1 determines, based on the restriction group table 141 (see FIG. 5), whether or not a group including the entered value of the item and values of items which have already been set has a restriction relationship.

If the group has a restriction relationship, then the image forming apparatus 1 reads out all sets of conditional expression data 51 of the group (restriction group) from the conditional expression storage portion 150.

If the conditional expression data 51 thus read out is only one set, then the image forming apparatus 1 displays the dialog screen 61 on the touch-sensitive panel display 10e as discussed above.

On the other hand, if a plurality of sets of conditional expression data 51 is read out, then the image forming apparatus 1 displays the dialog screen 63 as shown in FIG. 15A based on a restriction avoidance conditional expression having the smallest value of index among the restriction avoidance conditional expressions of the dialog screen 61.

If an OK button 631 is selected at this time, then the image forming apparatus 1 performs processing in a manner similar to that for the case where the OK button 621 is selected on the dialog screen 62. On the other hand, if a cancel button 632 is selected, then the image forming apparatus 1 performs processing in a manner similar to that for the case where the cancel button 622 is selected.

If a different item button 633 is selected, then the image forming apparatus 1 displays again the dialog screen 63 as shown in FIG. 15B based on a restriction avoidance conditional expression having the second smallest value of index. Then, if the OK button 631 is selected, or, if the cancel button 632 is selected, then the image forming apparatus 1 performs the processing as described above based on the restriction avoidance conditional expression. If the different item button 633 is selected, then the image forming apparatus 1 displays again the dialog screen 63 based on a restriction avoidance conditional expression having the third smallest value of index. Thereafter, every time the different item button 633 is selected, the image forming apparatus 1 repeats such processing. If there are not any other restriction avoidance conditional expressions, then the processing goes back to forward, namely, goes back to the processing based on the restriction avoidance conditional expression having the smallest value of index, and displays again the dialog screen 63.

Embodiments of the invention are described by taking an example in which a restriction avoidance conditional expression for a restriction group, primarily, related to hole-punching is generated and used. One or more embodiments of the present invention is also applicable to a case of generating a restriction avoidance conditional expression for a restriction group related to other items (for example, stapling, facsimile transmission, and copying) and using such a restriction avoidance conditional expression.

In one or more embodiments, the image forming apparatus 1 performs the processing shown in FIG. 11 by using only one item as an item of interest. Instead of this, however, a plurality of items may be selected as items of interest to generate a restriction avoidance conditional expression to change values of the selected items.

In one or more embodiments, the restriction group search portion 101 searches for all restriction groups shown in the restriction group table 141 (see FIG. 5). However, it is not necessary to search for a restriction group having an item related to a function not equipped in the image forming apparatus 1. For example, in the case where the image forming apparatus 1 is not provided with the finisher 10k, searching is not necessary for a restriction pair having values (conditions) of items for Finisher or items for Stapler. Thereby, a restriction avoidance conditional expression for such a restriction group is not generated, so that unnecessary processing can be omitted.

Alternatively, it is not necessary to search for a restriction group including an item related to a function of which use is prohibited by an administrator. Yet alternatively, it is not necessary to search for a restriction group including a value, of values of an item, which is prohibited from being selected by the administrator.

It is to be understood that the overall configuration of the print system 3 and the image forming apparatus 1, the constituent elements thereof, the content and order of the processing, the configuration of table, and the like can be appropriately modified without departing from the spirit of the present invention.

While embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A restriction avoidance processing determination apparatus for determining, when values of at least three items are mutually in a restriction relationship where applying the values concurrently are prohibited, avoidance processing for avoiding the restriction relationship, the apparatus comprising:
   a storage portion that stores, therein, degree of importance of each of the at least three items; and
   a determination portion that sets one item of the at least three items at a trigger item, determines whether or not the restriction relationship is to be avoided by changing the value of a lower item to another value, the lower item being an item given the degree of importance lower than or equal to the degree of importance of the trigger item, and determines, when the restriction relationship is determined to be avoided, processing of changing the value to the another value as the avoidance processing used when the value is to be set for the trigger item.

2. The apparatus according to claim 1, wherein, when there is a plurality of the lower items, then the determination portion determines whether or not the restriction relationship is to be avoided as follows:
   by selecting the lower items one by one in ascending order of the degree of importance and determining whether or not the restriction relationship is to be avoided by changing the value of the lower item selected to another value until a positive determination is made a predetermined number of times.

3. The apparatus according to claim 1, wherein, when there is a plurality of the another values settable for the lower item, then the determination portion determines whether or not the restriction relationship is to be avoided by changing to the another value, in order, from a predetermined another value of the another values.

4. The apparatus according to claim 1, wherein, when there is not any of the lower items, then the determination portion determines, as the avoidance processing used when the value is to be set for the trigger item, processing of not changing the value of the trigger item to the another value.

5. The apparatus according to claim 1, comprising
   a display portion that displays a screen showing the avoidance processing, and
   an avoidance processing portion that executes the avoidance processing when a user gives a permission to execute the avoidance processing.

6. The apparatus according to claim 1, wherein, when the restriction relationship is determined to be avoided by changing the value of the lower item to the another value, then the determination portion determines, as the avoidance processing, processing of displaying a screen on which the lower item is set not to allow a user to select the another value.

7. The apparatus according to claim 1, wherein, when there is a plurality of combinations of the at least three items, then the determination portion determines the avoidance processing collectively for the plurality of combinations.

8. The apparatus according to claim 1, wherein the determination portion determines the avoidance processing at a time when the values of the at least three items are to be set.

9. A restriction avoidance processing determination method for determining, when values of at least three items are mutually in a restriction relationship where applying the values concurrently are prohibited, avoidance processing for avoiding the restriction relationship, the method comprising:
   storing, in a storage portion, degree of importance of each of the at least three items;
   causing a computer to perform first determination processing of setting one item of the at least three items at a trigger item;
   causing the computer to perform determination processing of determining whether or not the restriction relationship is to be avoided by changing the value of a lower item to another value, the lower item being an item given the degree of importance lower than or equal to the degree of importance of the trigger item; and
   causing the computer to perform second determination processing of, when the restriction relationship is determined to be avoided, changing the value to the another value as the avoidance processing used when the value is to be set for the trigger item.

10. The method according to claim 9, wherein the determination processing includes, when there is a plurality of the lower items, determining whether or not the restriction relationship is to be avoided as follows:
   by selecting the lower items one by one in ascending order of the degree of importance and determining whether or not the restriction relationship is to be avoided by changing the value of the lower item selected to another value until a positive determination is made a predetermined number of times.

11. The method according to claim 9, wherein the determination processing includes, when there is a plurality of the another values settable for the lower item, determining whether or not the restriction relationship is to be avoided by changing to the another value, in order, from a predetermined another value of the another values.

12. The method according to claim 9, wherein the second determination processing includes, when there is not any of the lower items, determining, as the avoidance processing used when the value is to be set for the trigger item, processing of not changing the value of the trigger item to the another value.

13. The method according to claim 9, comprising
   causing the computer to perform display processing of displaying a screen showing the avoidance processing, and
   causing the computer to perform the avoidance processing when a user gives a permission to perform the avoidance processing.

14. The method according to claim 9, wherein the second determination processing includes, when the restriction relationship is determined to be avoided by changing the value of the lower item to the another value, determining, as the avoidance processing, processing of displaying a screen on which the lower item is set not to allow a user to select the another value.

15. A non-transitory computer-readable storage medium storing thereon a computer program used in a computer that determines, when values of at least three items are mutually in a restriction relationship where applying the values concurrently are prohibited, avoidance processing for avoiding the restriction relationship, and accesses a storage portion for storing, therein, degree of importance of each of the at least three items, the computer program causing the computer to perform processing comprising:
   first determination processing of setting one item of the at least three items at a trigger item;
   determination processing of determining whether or not the restriction relationship is to be avoided by changing the value of a lower item to another value, the lower item being an item given the degree of importance lower than or equal to the degree of importance of the trigger item; and
   second determination processing of, when the restriction relationship is determined to be avoided, changing the value to the another value as the avoidance processing used when the value is to be set for the trigger item.

16. The non-transitory computer-readable storage medium according to claim 15, wherein the determination processing includes, when there is a plurality of the lower items, determining whether or not the restriction relationship is to be avoided as follows:
   by selecting the lower items one by one in ascending order of the degree of importance and determining whether or not the restriction relationship is to be avoided by changing the value of the lower item selected to another value until a positive determination is made a predetermined number of times.

17. The non-transitory computer-readable storage medium according to claim 15, wherein the determination processing includes, when there is a plurality of the another values settable for the lower item, determining whether or not the restriction relationship is to be avoided by changing to the another value, in order, from a predetermined another value of the another values.

18. The non-transitory computer-readable storage medium according to claim 15, wherein the second determination processing includes, when there is not any of the lower items, determining, as the avoidance processing used when the value is to be set for the trigger item, processing of not changing the value of the trigger item to the another value.

19. The non-transitory computer-readable storage medium according to claim 15, wherein the processing further comprises:
   causing the computer to perform display processing of displaying a screen showing the avoidance processing, and
   causing the computer to perform the avoidance processing when a user gives a permission to perform the avoidance processing.

20. The non-transitory computer-readable storage medium according to claim 15, wherein the second determination processing includes, when the restriction relationship is determined to be avoided by changing the value of the lower item to the another value, determining, as the avoidance processing, processing of displaying a screen on which the lower item is set not to allow a user to select the another value.

* * * * *